United States Patent
Lee et al.

(10) Patent No.: US 8,137,496 B2
(45) Date of Patent: Mar. 20, 2012

(54) METHOD OF FABRICATING WIRE GRID POLARIZER

(75) Inventors: Su-mi Lee, Hwaseong-si (KR); Chang-ho Noh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 584 days.

(21) Appl. No.: 11/855,182

(22) Filed: Sep. 14, 2007

(65) Prior Publication Data

US 2008/0145568 A1  Jun. 19, 2008

(30) Foreign Application Priority Data

Dec. 19, 2006  (KR) .................. 10-2006-0130374

(51) Int. Cl.
*B44C 1/24* (2006.01)
*B29C 65/14* (2006.01)
*B29C 65/48* (2006.01)
*B29C 65/70* (2006.01)
*B32B 37/02* (2006.01)
*B32B 37/06* (2006.01)
*B32B 37/10* (2006.01)
*B32B 37/12* (2006.01)
*B32B 37/26* (2006.01)
*B44C 1/22* (2006.01)
*B29C 65/52* (2006.01)
*B32B 37/16* (2006.01)

(52) U.S. Cl. ......... 156/241; 156/239; 156/247; 156/249
(58) Field of Classification Search .................. 156/230, 156/239, 241, 247, 249
See application file for complete search history.

(56) References Cited

U.S. PATENT DOCUMENTS

| | | | | |
|---|---|---|---|---|
| 5,037,504 A | * | 8/1991 | Takeuchi | 216/40 |
| 5,110,707 A | * | 5/1992 | Fujita et al. | 430/256 |
| 5,909,266 A | * | 6/1999 | Matsuo et al. | 349/187 |
| 7,480,017 B2 | * | 1/2009 | Fisher et al. | 349/96 |
| 7,573,546 B2 | * | 8/2009 | Lee et al. | 349/96 |
| 2004/0250945 A1 | * | 12/2004 | Zheng et al. | 156/230 |
| 2005/0046943 A1 | * | 3/2005 | Suganuma | 359/497 |
| 2006/0019076 A1 | * | 1/2006 | Kim et al. | 428/209 |
| 2006/0183061 A1 | * | 8/2006 | Hwang et al. | 430/324 |

FOREIGN PATENT DOCUMENTS

JP    2001168574 A  *  6/2001

* cited by examiner

*Primary Examiner* — Sonya Mazumdar
(74) *Attorney, Agent, or Firm* — Sughrue Mion, PLLC

(57) ABSTRACT

Provided is a method of fabricating a wire grid polarizer. The method includes: forming a photocatalytic layer on a first substrate; forming a patterned resin layer having a plurality of parallel grooves; forming a wire grid by filling the grooves with a metal; and transferring the wire grid and the resin layer to a second substrate.

28 Claims, 6 Drawing Sheets

METHOD OF FABRICATING WIRE GRID POLARIZER

CROSS-REFERENCE TO RELATED PATENT APPLICATION

This application claims the benefit of Korean Patent Application No. 10-2006-0130374, filed on Dec. 19, 2006, in the Korean Intellectual Property Office, the disclosure of which is incorporated herein in its entirety by reference.

BACKGROUND OF THE INVENTION

1. Field of the Invention

The present invention relates to a method of fabricating a wire grid polarizer, and more particularly, to a method of fabricating a wire grid polarizer having a fine structure over a large area.

2. Description of the Related Art

In general, wire grid polarizers have a wire grid structure in which stripe-shaped metal wires having a certain pitch are arranged on a transparent substrate. If the pitch of the metal wires is similar to or greater than the wavelength of an electromagnetic wave, diffraction occurs. However, if the pitch of the metal wires is significantly smaller than the wavelength of the electromagnetic wave, split of polarization occurs. That is, if the pitch of the metal wires, that is, a distance between adjacent metal wires, is sufficiently small, light polarized parallel to the metal wires, that is, S-polarized light, is reflected by the metal wires, and light polarized perpendicular to the metal wires, that is, P-polarized light, is transmitted through the metal wires. The width, thickness, and pitch of the metal wires affect the polarization characteristics, such as the transmittance and reflectance, of the wire grid polarizer.

In order for a wire grid polarizer to be used for visible light having wavelengths of 400 to 700 nm, the wire grid polarizer is generally required to have a pitch of less than $\lambda/5$, that is, a feature size of less than 100 nm. However, it is very difficult to fabricate a wire grid having a feature size of less than 100 nm using conventional semiconductor photolithography, and particularly difficult to form a pattern over a large area. A conventional method of fabricating a wire grid polarizer comprises forming a master pattern using E-beam lithography, fabricating a mold, which is a reverse image of the master pattern, using electroplating, sequentially stacking a metal layer and a polymer layer on a transparent substrate to form a pattern on the polymer layer using the mold, and depositing a metal grid on the pattern using oblique deposition. However, the conventional method is too complicated for mass production of the wire grid polarizer, and equipment, such as vacuum deposition equipment, required for the conventional method is expensive. Thus, the conventional method is not commercially viable. Furthermore, since a wire grid polarizer fabricated using the conventional method has a size of several inches, it is difficult to apply the wire grid polarizer to a large liquid crystal display (LCD) panel having a size of several tens of inches.

SUMMARY OF THE INVENTION

The present invention provides a method of fabricating a wire grid polarizer having a fine structure over a large area.

According to an aspect of the present invention, there is provided a method of fabricating a wire grid polarizer, the method including: forming a photocatalytic layer by coating a photocatalytic compound on a first substrate; forming a resin layer having a plurality of parallel grooves, on the photocatalytic layer, each of the grooves being spaced apart from the other; activating the photocatalytic layer; filling the grooves of the resin layer with a metal to provide a grid of metal wires formed in the resin layer; and transferring the grid of metal wires and the resin layer to a second substrate to provide a wire grid polarizer comprising the second substrate, the resin layer and the grid of metal wires. A layer of a water-soluble polymer may be disposed between the photocatalytic layer and the resin layer to protect the photocatalytic layer.

The photocatalytic compound may be a Ti-containing organometallic compound, which may be one selected from the group consisting of tetraisopropyl titanate, tetra-n-butyl titanate, tetrakis(2-ethyl-hexyl) titanate, and polybutyltitanate.

The photocatalytic layer may be heated, prior to forming the resin layer or prior to providing the water soluble polymer layer, at a temperature of 20 to 200° C. to impart an amorphous structure.

The photocatalytic layer and the water-soluble polymer layer each may have a thickness of 10 to 1000 nm.

The water-soluble polymer may be at least one selected from the group consisting of polyvinyl alcohol, polyvinyl phenol, polyvinyl pyrrolidone, polyacrylic acid, polyacrylamide, and gelatin. The water-soluble polymer layer may be heated at a temperature of 0 to 80° C.

An electroless plating method may be used to form the grid of metal wires. The metal may be at least one selected from the group consisting of Cu, Ni, Ag, and Au. A metal nucleus may be formed in the grooves of the resin layer, prior to the filling the grooves of the resin layer with the metal.

The second substrate transmits visible light or ultraviolet (UV) light and may be flexible. The second substrate may be formed of one selected from the group consisting of an acrylic resin, polyester, polycarbonate, polyethylene, a polyethersulfon compound, an olefin maleimide copolymer, and a norbonen-based resin.

The resin layer having a plurality of grooves may be provided using a patterned stamp. The resin layer may be formed of a polymethylmethacrylate (PMMA)-based polymer or a UV curable resin, to a thickness of 50 to 500 nm, a width of 10 to 100 nm and a height of 50 to 500 nm. The metal wire grid may have a pitch of 50 to 200 nm A wire grid polarizer having a fine structure can be easily fabricated over a large area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
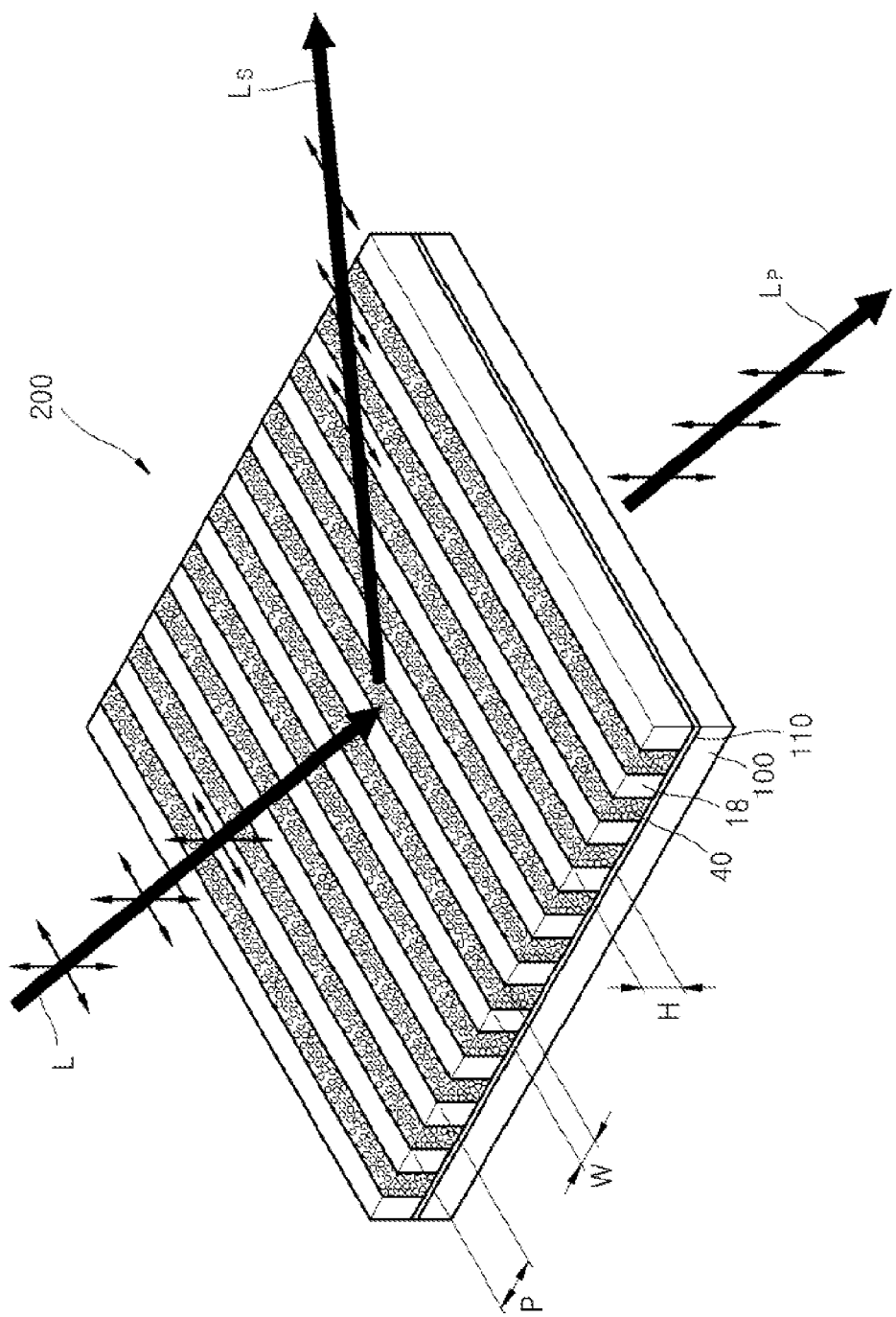
FIG. 1 is a perspective view of a wire grid polarizer according to an embodiment of the present invention.

The present invention will now be described more fully with reference to the accompanying drawings, in which exemplary embodiments of the invention are shown. In the drawings, the thicknesses of layers or regions are exaggerated for clarity.

FIG. 1 is a perspective view of a wire grid polarizer 200 according to an embodiment of the present invention.

The structure of the wire grid polarizer 200 according to the current embodiment of the present invention will now be explained with reference to FIG. 1. Referring to FIG. 1, the wire grid polarizer 200 has an embedded structure including a transparent substrate 100 having a surface, a stripe-patterned resin layer 18 formed on the surface of the transparent substrate 100, the resin layer providing a plurality of parallel, elongated, separated grooves, and a grid of a plurality of parallel wires 40 which each are formed in the grooves. An adhesive layer 110 is optionally formed on the transparent substrate 100 to fix the grid of wires 40 to the transparent substrate 100. It should be noted that, throughout the specification, the numerical reference 40 is used to indicate an individual wire or a grid of the wires. The stripe-patterned resin layer 18 supports and protects the wire grid 40. The height H, width W, and pitch P of the wire grid 40 may be varied according to optical design.

It is known that when a diffraction grating has a pitch greater than the wavelength of incident light L, the diffraction grating diffracts the incident light L into a plurality of light beams, while when the pitch of the diffraction grating is less than half of the wavelength of the incident light L, the diffraction grating reflects S-polarized light Ls and transmits P-polarized light Lp corresponding to $0^{th}$ order diffracted light.

The polarization properties of the wire grid polarizer 200 can be represented by a polarization extinction ratio (PER) and a transmittance. The polarization extinction ratio represents the ratio of the optical power of light polarized perpendicular to the wire grid 40 to the optical power of light polarized parallel to the wire grid 40, and the transmittance represents the ratio of the optical power of transmitted light, that is, light perpendicular to the wire grid 40 to incident light. In order for the wire grid polarizer 200 to have a high polarization extinction ratio and a high transmittance, the pitch P of the wire grid 40 should be far less than the wavelength of incident light. Further, the width W of the wire grid 40 may be less than a half of the wavelength of incident light and the height H of the wire grid 40 may be higher than a skin depth, where a skin depth is a penetration distance of an electromagnetic wave into a medium, in this case, the wire grid 40. Since the individual wire has a width W of 10 to 100 nm and a height H of 50 to 500 nm, and the grid has a pitch P of 50 to 200 nm, the wire grid polarizer 200 can have a high polarization extinction ratio and a high transmittance for visible light and ultraviolet (UV) light having wavelengths of 400 to 700 nm.

FIGS. 2A through 2J illustrate a method of fabricating a wire grid polarizer according to an embodiment of the present invention.

Figure 2A:
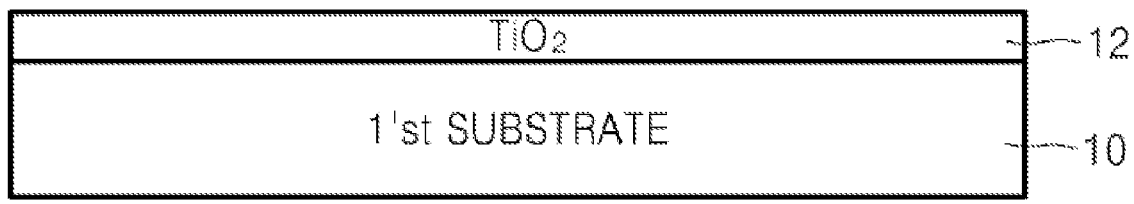
FIGS. 2A through 2J illustrate a method of fabricating a wire grid polarizer according to an embodiment of the present invention.
Figure 2B:
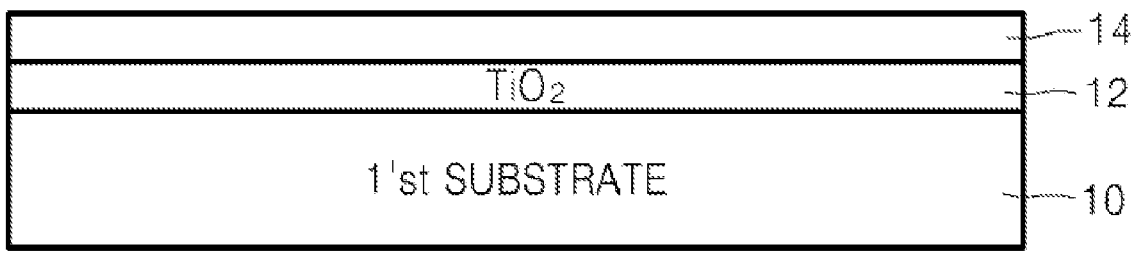

Referring to FIGS. 2A and 2B, a photocatalytic compound is coated on a surface of a prepared first substrate 10 to form a photocatalytic layer 12. The photocatalytic compound is inactive when not exposed to light, but activated when exposed to light, e.g., UV light, thereby increasing its reactivity. In an embodiment, the photocatalytic compound is inactive when not exposed to UV light, but electron-excited when exposed to UV light, thereby exhibiting a reducing ability. In detail, the photocatalytic compound may be a Ti-containing organometallic compound that can be transformed into $TiO_2$ by heat treatment after applied to the substrate. Examples of the photocatalytic compound include tetraisopropyl titanate, tetra-n-butyl titanate, tetrakis(2-ethyl-hexyl) titanate, and polybutyltitanate. The photocatalytic compound may be dissolved in an appropriate solution, e.g., an isopropyl alcohol solution, and may be coated on the first substrate 10 by known methods such as spin coating, spray coating, or screen printing. After the photocatalytic compound is coated to a thickness of 10 to 1000 nm on the first substrate 10, the photocatalytic compound and the first substrate 10 is heated for a period of time sufficient to form an amorphous structure, for example about 20 minutes at a temperature of 20 to 200° C. on a hot plate or in a convection oven so that the photocatalytic layer 12 is formed to have an amorphous structure. If the photocatalytic compound is heated at a temperature greater than 200° C., the photocatalytic layer 12 may be formed to be crystalline, thereby deteriorating the optical properties of the photocatalytic layer 12. Accordingly, the photocatalytic compound is heated at a temperature lower than 200° C.

Next, referring to FIG. 2B, a water-soluble polymer compound may optionally be applied to the photocatalytic layer 12 to form a protective layer 14 for protecting the photocatalytic layer 12. The water-soluble polymer compound may include a homopolymer, such as polyvinyl alcohol, polyvinyl phenol, polyvinyl pyrrolidone, polyacrylic acid, polyacrylic amide, gelatin, or a copolymer formed from two or more monomeric components. The water-soluble polymer compound may be dissolved in water or an organic solvent and coated on the photocatalytic layer 12 by known methods such as spin coating, spray coating, or screen printing. After the water-soluble polymer compound is coated to a thickness of 10 to 1000 nm on the photocatalytic layer 12, the water-soluble polymer compound and the photocatalytic layer 12 and the first substrate 10 may be heated and dried for about 5 minutes at a temperature of 0 to 80° C. on a hot plate or in a convection oven to form the protective layer 14. The protective layer 14 not only protects the photocatalytic layer 12 but also increases the stability of the photocatalytic layer 12. In particular, since the water-soluble polymer compound constituting the protective layer 14 promotes photoreduction in a subsequent UV exposure process, the protective layer 14 can promote the activation of the photocatalytic layer 12.

A photosensitizer compound may be added to the water-soluble polymer compound. In this case, photosensitivity to UV light may be further improved. The photosensitizer compound may include, but are not limited to, a tar colorant, a potassium or sodium salt of chlorophylline, riboflavine and a derivative thereof, water-soluble annatto, $CuSO_4$, caramel, curcumine, cochinal, citric acid, ammonium citrate, sodium citrate, oxalic acid, K-tartrate, Na-tartrate, ascorbic acid, formic acid, triethanolamine, monoethanolamine, or malic acid.

Figure 2C:
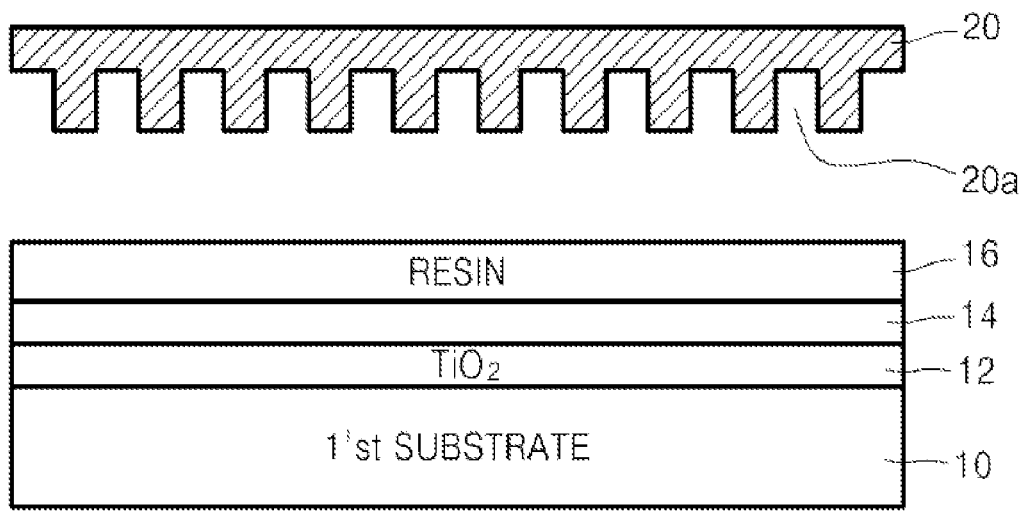
Figure 2D:
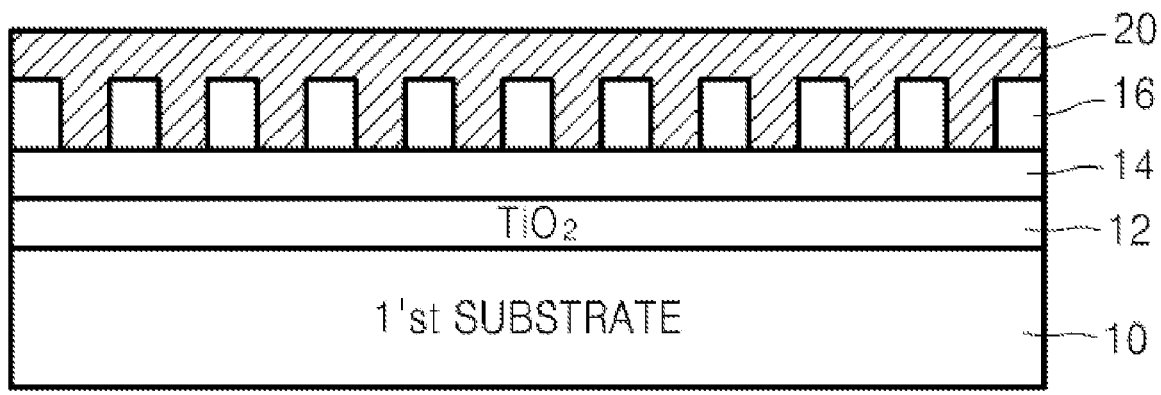
Figure 2E:
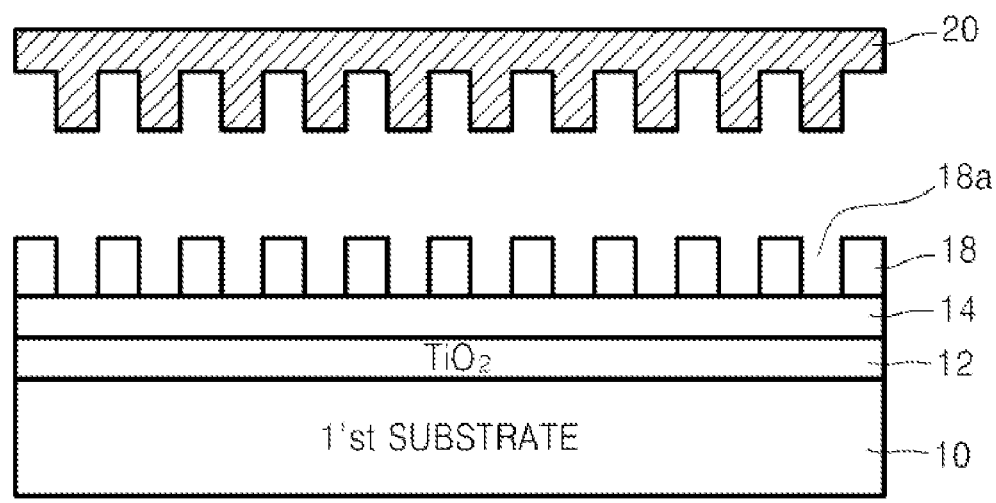

Referring to FIGS. 2C through 2E, a stripe-patterned resin layer 18 with a plurality of periodic or parallel grooves 18a is formed on the protective layer 14. The grooves are spaced apart from each other. In detail, after a resin layer 16 formed of a polymethylmethacrylate (PMMA)-based polymer or a UV curable resin is coated to a thickness of 50 to 500 nm on the protective layer 14, a stripe-patterned stamp 20 with a plurality of periodic grooves 20a is pressed onto the resin layer 16 and then separated from the resin layer 16 to transfer the stripe pattern to the resin layer 16, thereby forming the stripe-patterned resin layer 18. The UV curable resin may include, but is not limited to, pentatetrathritol(meth)acrylate, depentatetrathritol(meth)acrylate, polyester(meth)acrylate, or urethane(meth)acrylate, which has a crosslinkable functional group.

The stripe-patterned stamp 20 may be formed by known methods such as laser interference lithography, E-beam lithography, or nano imprint lithography. Since the process of forming the stripe-patterned stamp 20 is well known, a detailed explanation thereof will not be given.

Even though FIGS. 2C through 2F depict that the bottom of the grooves 18a reaches to the surface of the protective layer 14, the grooves 18a may have a depth which is smaller than the height of the resin layer 18, as long as the grid of wires 40, which will be formed in the grooves 18a, can polarize the incident light.

Figure 2F:
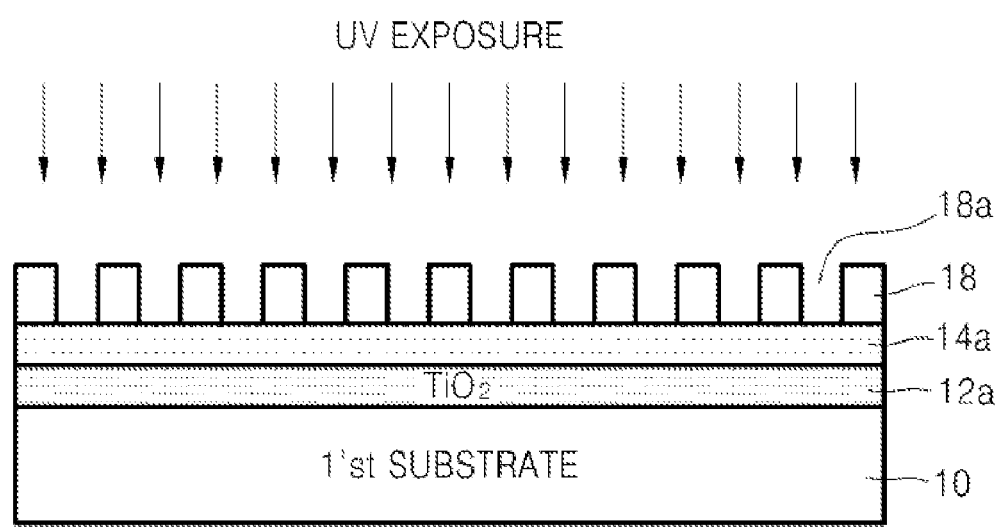

Referring to FIG. 2F, UV light is irradiated to the photocatalytic layer 12 and the protective layer 14 to activate both the photocatalytic layer 12 and the protective layer 14, thereby forming an activated photocatalytic layer 12a and an activated protective layer 14a. Since the photocatalytic layer 12 is electron-excited by photoreaction to exhibit a reducing ability when exposed to the UV light, metal ions can be easily reduced during a subsequent electroless plating process and thus metal crystals can be deposited and grown on the activated photocatalytic layer 12a. Since the water-soluble polymer compound constituting the activated protective layer 14a is also exposed to the UV light, the activation of the photocatalytic layer 12 can be promoted further.

Figure 2G:
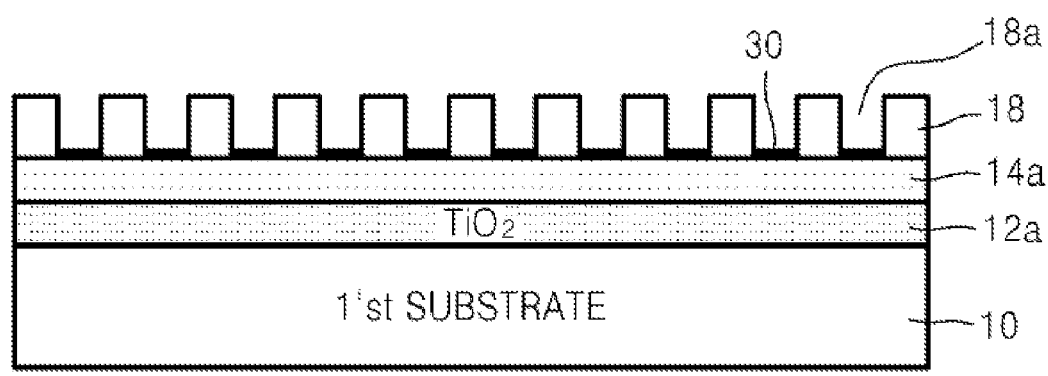
Figure 2H:
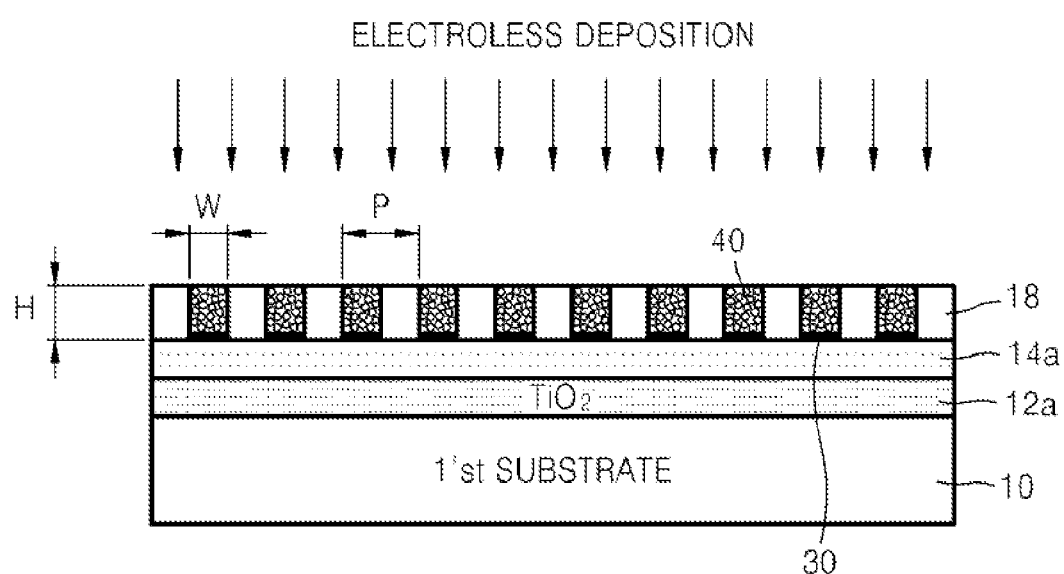

Referring to FIGS. 2G and 2H, metal crystals are grown in the grooves 18a of the stripe-patterned resin layer 18 by electroless plating to form a grid of wires 40. A metal used for the electroless plating may include Cu, Ni, Ag, or Au. Since the activated photocatalytic layer 12a and the activated protective layer 14a have a reducing ability, the metal crystals 30 can be easily deposited and grown in the grooves 18a of the stripe-patterned resin layer 18. The wire grid 40 may be formed to have a wire width W of 10 to 100 nm, a wire height H of 50 to 500 nm, and a pitch P of 50 to 200 nm. The length of the individual wire 40 is not limited to a specific value.

An electrolytic solution used for the electroless plating may be a solution of a metal compound containing Cu or Ag. The electroless plating may be performed using a well-known method, which will now be explained in detail. For example, when the electroless plating process is performed using a Cu-containing compound, a stacked structure including the activated photocatalytic layer 12a, the activated protective layer 14a, and the stripe-patterned resin layer 18 is dipped in a plating solution including a copper salt, a reducing agent, a complexing agent, a pH adjusting agent, a pH buffering agent, and a conditioning agent. The copper salt provides copper ions during nucleation and growth, and examples of the copper salt include a chloride, a nitrate, a sulfate, and a cyanide. The reducing agent helps the reduction of the metal ions, and examples of the reducing agent include $NaBH_4$, $KBH_4$, $NaH_2PO_2$, hydrazine, formalin, and polysaccharide such as glucose. The complexing agent prevents the precipitation of a hydroxide in the alkaline solution and controls the concentration of the dissociated metal ions to prevent the decomposition of the metal salt and to control the electroless plating rate. Examples of the complexing agent include, but are not limited to, an ammonia solution, an acetic acid, a tartrate, a chelate EDTA, and an organic amine compound. The pH adjusting agent controls the pH of the plating solution, and includes an acid or base compound. The pH buffering agent keeps the pH level of the plating solution within a certain range, and includes one of various organic acids or a weak acid inorganic compound. The conditioning agent can improve coating and planarization properties, and examples of the conditioning agent include a surfactant, and an adsorbent material that can adsorb components interrupting the crystal growth.

Prior to the filling the metal in the grooves of the patterned resin layer, a metal nucleus may be formed in the grooves. For example, as a pre-treatment prior to the electroless plating, the stacked structure containing the activated photocatalytic layer 12a, the activated protective layer 14a, and the stripe-patterned resin layer 18 may be dipped in a metal salt solution to further deposit a small amount of a catalytic metal 30 for the nucleation in the grooves 18a of the stripe-patterned resin layer 18. The metal salt solution may be a Ag salt solution, a Pd salt solution, or a mixed solution thereof, and thus a small amount of Ag, Pd, or an alloy thereof can be deposited as the catalytic metal 30 in the grooves 18a of the stripe-patterned resin layer 18. The catalytic metal 30 promotes the nucleation of the metal crystals during the electroless plating.

Figure 2I:
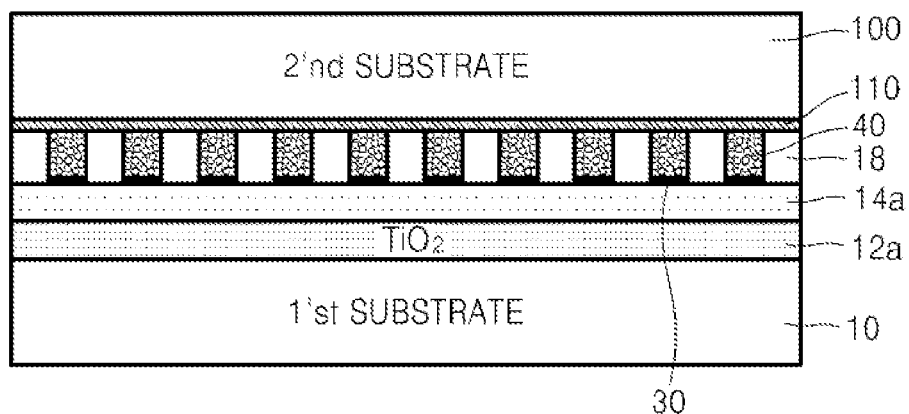
Figure 2J:
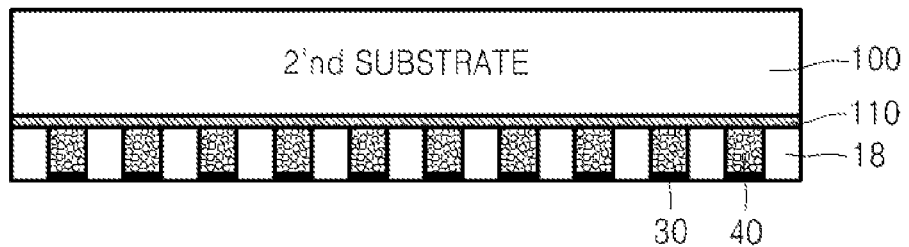
Figure 2J:
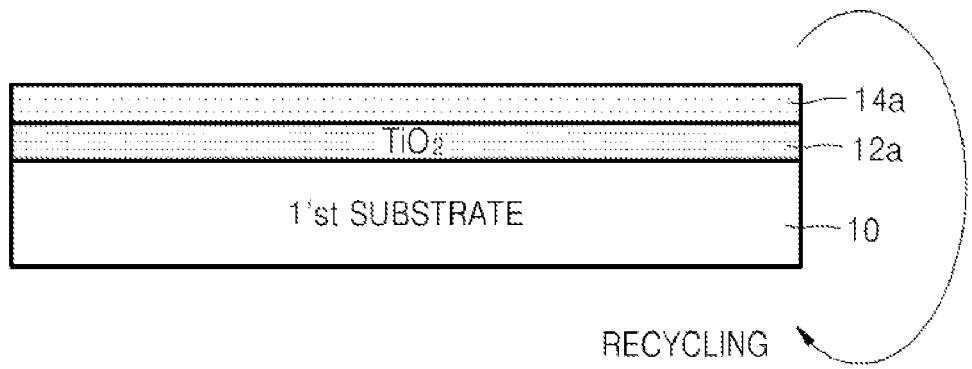

Referring to FIGS. 2I and 2J, a second substrate 100 having a surface on which an adhesive layer 110 is coated is bonded to a top surface of the stripe-patterned resin layer 18 and the wire grid 40 formed by the electroless plating. Next, the assembly of the second substrate 100, the stripe-patterned resin layer 18 and the wire grid 40 is separated from the activated protective layer 14a, thereby fabricating an embedded wire grid polarizer including the stripe-patterned resin layer 18 with a plurality of parallel grooves and the grid of a plurality of parallel wires 40, in which the grooves are spaced apart from each other and each of the wires is formed in the respective individual groove of the stripe-patterned resin layer 18.

The adhesive layer 110 may be a thin film treated with a silane-coupling agent. The second substrate 100 may be formed of a transparent material through which visible light or UV light may be transmitted, and preferably may be a flexible transparent substrate. The flexible transparent substrate may be formed of an acrylic resin, polyester, polycarbonate, polyethylene, a polyethersulfon compound, an olefin maleimide copolymer, or a norbonen-based resin. The first substrate 10 and the activated photocatalytic layer 12a and the activated protective layer 14a stacked on the first substrate 10, which are separated from the stripe-patterned resin layer 18, may be recycled and used again to fabricate another wire grid polarizer.

Since the above method of fabricating a wire grid polarizer according to the current embodiment of the present invention is simple, the wire grid polarizer can be mass produced, and since expensive equipment is not required, the method can be commercially viable. Also, since a wire grid polarizer having a large area can be fabricated using the method, the resulting wire grid polarizer is suitable for use in a large liquid crystal display (LCD) panel. The wire grid polarizer according to the present invention applied to a large LCD panel is superior to an absorbing polarizer formed of a birefringent material. For example, the absorbing polarizer formed of a birefringent material losses light, since 50% of light is transmitted through the absorbing polarizer, and the remaining 50% is absorbed. Also, when the absorbing polarizer is exposed to a light source of high brightness, the absorbing polarizer is unstable due to thermal deformation of a dielectric material. However, since the wire grid polarizer according to embodiments of the present invention reflects S-polarized light and transmits P-polarized light, the wire grid polarizer of the present invention can use almost 100% of light by recycling the reflected S-polarized light. Furthermore, since a wire grid formed of a metal is formed on the transparent substrate, the wire grid polarizer is thermally stable even when exposed to a light source of high brightness.

The method of fabricating the wire grid polarizer according to embodiments of the present invention can be used to easily form a wire grid polarizer having a fine structure using electroless plating on the photocatalytic layer since the photocatalytic layer activated by UV light exhibits a reducing ability. Accordingly, since the method is simple, the wire grid polarizer can be mass produced, and since expensive equipment is not required, the method can be commercially viable. Also, the method of fabricating the wire grid polarizer according to the present invention can be used to fabricate a wire grid polarizer having a large area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a wire grid polarizer, the method comprising:
   forming a photocatalytic layer by coating a photocatalytic compound on a first substrate;
   forming a resin layer having a plurality of parallel grooves, on the photocatalytic layer, each of the grooves being spaced apart from the other;
   activating the photocatalytic layer;
   filling the grooves of the resin layer with a metal to provide a grid of metal wires formed in the resin layer;
   providing a second substrate having an inner surface on which an adhesive layer is coated,
   bonding the second substrate by using the adhesive layer to top surfaces of the resin layer and the grid of metal wires; and
   separating the resin layer and the grid of metal wires from the photocatalytic layer and thus transferring the resin layer and the grid of metal wires to the second substrate.

2. The method of claim 1, further comprising forming a layer of a water-soluble polymer between the photocatalytic layer and the resin layer.

3. The method of claim 1, wherein the photocatalytic compound is a Ti-containing organometallic compound.

4. The method of claim 3, wherein the Ti-containing organometallic compound is one selected from the group consisting of tetraisopropyl titanate, tetra-n-butyl titanate, tetrakis (2-ethyl-hexyl)titanate, and polybutyltitanate.

5. The method of claim 1, further comprising heating the photocatalytic layer, prior to forming the resin layer, at a temperature of 20 to 200° C.

6. The method of claim 2, further comprising heating the photocatalytic layer, prior to forming the layer of the water-soluble polymer, at a temperature of 20 to 200° C.

7. The method of claim 1, wherein the photocatalytic layer has an amorphous structure.

8. The method of claim 1, wherein the photocatalytic layer is formed to a thickness of 10 to 1000 nm.

9. The method of claim 2, wherein the water-soluble polymer is at least one selected from the group consisting of polyvinyl alcohol, polyvinyl phenol, polyvinyl pyrrolidone, polyacrylic acid, polyacrylamide, and gelatin.

10. The method of claim 2, further comprising heating the layer of the water-soluble polymer at a temperature of 0 to 80° C.

11. The method of claim 2, wherein the layer of the water-soluble polymer is formed to a thickness of 10 to 1000 nm.

12. The method of claim 2, wherein the layer of the water-soluble polymer comprises a photosensitizer compound.

13. The method of claim 12, wherein the photosensitizer compound is at least one selected from the group consisting of a tar colorant, a potassium or sodium salt of chlorophylline, riboflavine and a derivative thereof, water-soluble annatto, $CuSO_4$, caramel, curcumine, cochinal, citric acid, ammonium citrate, sodium citrate, oxalic acid, K-tartrate, Na-tartrate, ascorbic acid, formic acid, triethanolamine, monoethanolamine, and malic acid.

14. The method of claim 1, wherein the activating the photocatalytic layer is performed by irradiating ultraviolet light.

15. The method of claim 1, wherein the filling the grooves of the resin layer with a metal is performed by an electroless plating method.

16. The method of claim 1, wherein the metal used to form the grid of metal wires is at least one selected from the group consisting of Cu, Ni, Ag, and Au.

17. The method of claim 1, further comprising forming a metal nucleus in the grooves of the resin layer, prior to the filling the grooves of the resin layer with the metal.

18. The method of claim 17, wherein the metal nucleus is formed of a metal salt selected from a Ag salt, a Pd salt, or a mixture thereof.

19. The method of claim 1, wherein the second substrate transmits visible light or ultraviolet (UV) light.

20. The method of claim 19, wherein the second substrate is a flexible transparent substrate.

21. The method of claim 20, wherein the flexible transparent substrate is formed of one selected from the group consisting of an acrylic resin, polyester, polycarbonate, polyethylene, a polyethersulfon compound, an olefin maleimide copolymer, and a norbonen-based resin.

22. The method of claim 1, wherein the forming of the resin layer having a plurality of grooves is performed using a stamp.

23. The method of claim 1, wherein the resin layer is formed of a polymethylmethacrylate (PMMA)-based polymer or a UV curable resin.

24. The method of claim 1, wherein the resin layer has a thickness of 50 to 500 nm.

25. The method of claim 1, wherein the metal wires have a width of 10 to 100 nm.

26. The method of claim 1, wherein the metal wires have a height of 50 to 500 nm.

27. The method of claim 1, wherein the grid of metal wires has a pitch of 50 to 200 nm.

28. The method of claim 2, wherein the transferring the grid of metal wires and the resin layer to the second substrate comprises bonding the second substrate by using the adhesive layer to top surfaces of the resin layer and the grid of metal wires; and separating the bonded layers consisting of the second substrate, the resin layer and the grid of metal wires from the layer of water-soluble polymer.

* * * * *